Figure 1:
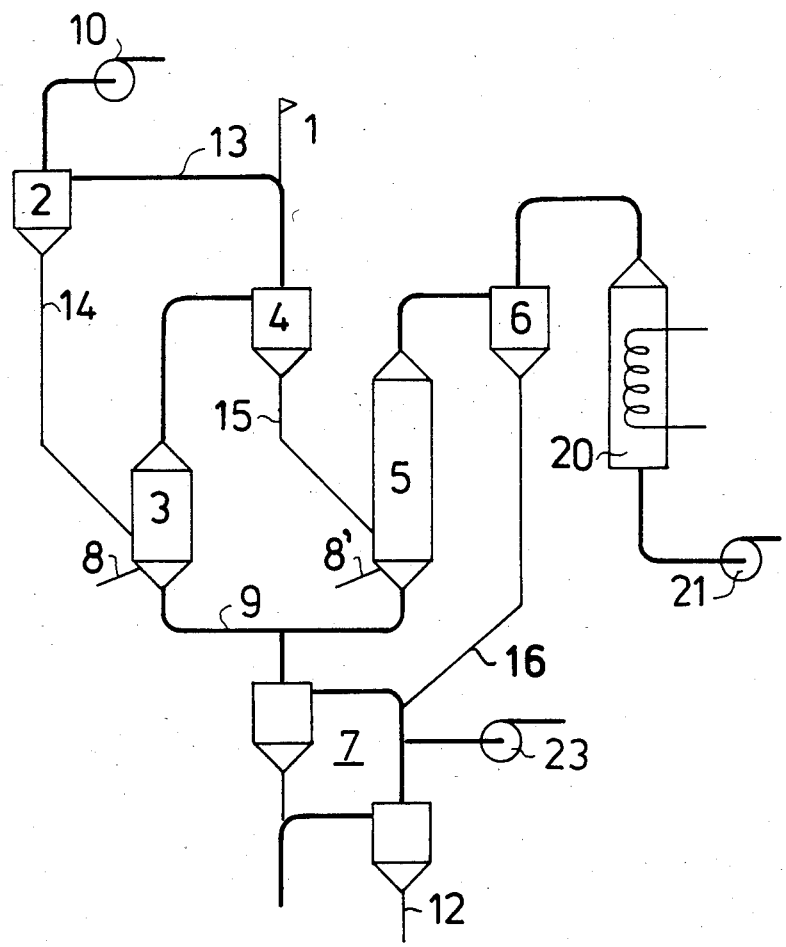

United States Patent [19]

Hundebol

[11] Patent Number: 4,592,900
[45] Date of Patent: Jun. 3, 1986

[54] METHOD OF REMOVING CADMIUM FROM RAW PHOSPHATE

[75] Inventor: Soren Hundebol, Copenhagen, Denmark

[73] Assignee: F. L. Smidth & Co. A/S, Denmark

[21] Appl. No.: 709,556

[22] Filed: Mar. 8, 1985

[30] Foreign Application Priority Data

Mar. 9, 1984 [DK] Denmark .............................. 1537/84

[51] Int. Cl.⁴ .......................................... C01B 25/26
[52] U.S. Cl. ..................................... 423/167; 432/14; 432/15
[58] Field of Search ........................... 423/167, 14, 15

[56] References Cited

U.S. PATENT DOCUMENTS 4,017,585  4/1977  Angevine et al. ................. 423/320
4,321,238  3/1982  Henin ................................. 423/320
4,555,388  11/1985  Hundebol ........................... 423/167

Primary Examiner—John Doll
Assistant Examiner—Wayne A. Langel

Attorney, Agent, or Firm—Brumbaugh, Graves, Donohue & Raymond

[57] ABSTRACT

A method of removing cadmium from raw phosphate material in an apparatus comprising a preheater section (2,13) a reactor section (3,4,5), a cooler section (7) and an exit gas cleaning section having a cadmium condenser (6,20,21), where the reactors (3,5) work in series and are formed as suspension reactors, or alternatively as a suspension reactor and a fluid-bed reactor, and where the treated raw phosphate in the first reactor having a short material retention time is suspended in a gas/fuel mixture and through a flash-process heated to a reaction temperature of 750°–1050° C. to be further heated subsequently in a reducing or neutral atmosphere in the second reactor which has a strongly reduced gas supply as compared with the first reactor and has at least three times as long a material retention time, by which the cadmium content is substantially expelled from the raw phosphate and carried away with the exit gas from the second reactor, while the cleaned phosphate is passed to the cooler section of the plant for further treatment.

8 Claims, 2 Drawing Figures

METHOD OF REMOVING CADMIUM FROM RAW PHOSPHATE

The heavy metal cadmium (Cd=112) is present in varying amounts i.e. in various types of raw phosphate material used for manufacturing phosphate fertilizers. Phosphates of volcanic origin (e.g. phosphate from Cola in the USSR and from South Africa) usually have very low concentrations of cadmium, but on the other hand these phosphates occur only in very limited quantities not nearly able to satisfy the demand for raw material for the production of phosphate fertilizers. When producing such fertilizers today sedimentray raw phosphate must consequently be used extensively, which, depending on the deposit, may contain cadmium from 15 ppm to as much as 100 ppm. The scarcity of sedimentary phosphate deposits with low cadmium content means that a large number of the phosphate consumers in the world will consequently, in future, be forced to use phosphate with a high cadmium content. Similarly, unless countermeasures are taken, steadily increasing amounts of cadmium must be expected in the finished phosphate fertilizers and resulting increased spreading of cadmium through the food chains, whereby the heavy metal reaches animals and human beings in whom it accumulates especially in the kidneys and may cause kidney damage and failure when the concentration in the individual organism exceeds a certain limit. To ensure that this limit is not exceeded the cadmium content in the phosphate used should not exceed 25 ppm.

If the fertilizer product is superphosphate the total amount of cadmium will live through the manufacturing process, for which reason one should be obliged only to use raw phosphate deposits with low cadmium content for such production. If the fertilizer production proceeds via the manufacture of phosphoric acid as an intermediate product, and which gives gypsum as a waste product, as is the case with other phosphate fertilizer products, cadmium will typically distribute itself between the waste product and the finished fertilizer approximately in the ratio 1:2. Thus in this case a certain reduction takes place in the cadmium content, but not enough to meet the safety demands on the main product; and the removal of the cadmium containing waste product, the gypsum, will go on causing problems.

The sedimentary types of raw phosphate usually consist of small crystals of the mineral carbonate apatite, also known as francolite, which is puttied together into larger conglomerates called nodules or oolites (because of their rounded, egg-like shape). The oolites, typically 100–500 mu large, also contain other minerals in varying, smaller amounts and a minor amount of organic material. The latter comprises remnants of various animal and vegetable matter which have sedimented simultaneously with the phosphate mineral. Cadmium is present in carbonate apatite presumably as a substitute for calcium, i.e. as cadmium oxide. By a suitable reducing agent this cadmium oxide can be reduced to metallic cadmium. If the reduction takes place above the boiling point of cadmium, which is 765° C., cadmium evaporates directly from the phosphate. Experiments have shown that at suitable temperatures the organic material contained in the raw phosphate is sufficient as a reducing agent to ensure the desired reduction. As the organic material and the cadmium are evenly distributed in the oolites so that from the beginning of a chemical reaction there exists an intimate mixture of the reactants, the reaction can be obtained at a temperature of about 1100° C. during a period of time of about 10 seconds. High treatment temperatures will accelerate the expulsion of cadmium, and the reaction does not necessarily presuppose a CO-containing atmosphere, but may take place in a neutral or slightly reducing atmosphere, whereas an oxygen-containing atmosphere must be avoided as the driven off cadmium metal will immediately burn to cadmium oxide and resettle on the oolites. From the above it is thus evident that a thermal treatment of raw phosphates is one solution to the cadmium cleaning problem.

Apparatus of known types, e.g. rotary kilns or flash burning plants can advantageously be used for this purpose. Comparative experiments with these two type of plant have surprisingly shown that suspension calcining (in a flash plant) of the raw phosphate as compared with the rotary kiln treatment is far superior to the latter both as regards treatment time and reduction of carbonate content. Suspension calcining in an apparatus of the type known from FR-B-2486924, consisting of a preheater section, a reactor (or calciner) with a precipitation cyclone and a cooler section, and in which apparatus there may be built in a cadmium condensor of known type in the exit gas outlet, entails, however, a number of problems as regards operation, demanding very much fuel, large material demands on the cyclone construction, blocking of the precipitaion cyclone and a very comprehensive exit gas treatment equipment. It also lacks the possibility of being able to use the reactor exit gas efficiently for preheating in the plant. If, however, a two-stage reactor plant is used, as is known e.g. from GB-A-2132180 or from DK patent application No. 83/4433, according to which the first stage of both is a suspension reactor, while the second stage is either another suspension reactor or a fluid-bed reactor, the disadvantages mentioned in connection with FR-B-2486924 are substantially avoided.

Consequently, it is the object of the invention, by using a two-stage process apparatus known per se, to device a new and upgraded method of removing cadmium from raw phosphate by thermal treatment prior to the raw phosphate being used for manufacturing phosphate fertilizers.

According to the invention, a method of cleaning cadmium-containing raw phosphate material of its cadmium content in a multi-stage reactor plant comprising a preheater, two reactors working in series, of which the first reactor is a suspension reactor and the second reactor is a suspension reactor or a fluid-bed reactor, and a cooler for cooling the product treated in the reactors, is characterized in that the raw phosphate material after preheating is introduced into the first reactor stage for a short material retention time during which the material is suspended in an oxygen-containing gas/fuel mixture and heated to a reaction temperature of between 750° and 1050° C. in a flash-process during which a total amount of fuel supplied separately to the first reactor stage is used; that the suspension thus heated is passed to a separator for precipitation of the heated material from the gas; and that the material precipitated is passed to the second reactor stage, an oxygen-containing gas supply to which is not more than 20%, preferably between 5 and 15%, of the gas supply to the first reactor stage, and the material retention time in which is at least three times the material retention time of the first stage, in order to be subjected to further heat treatment during the retention in the second stage in a reducing or neutral atmosphere at a temperature which is not more than 100° C. higher that the temperature of the first stage, whereby the cadmium content is substantially driven off from the material and carried away from the second reactor stage together with its exit gas, while the cleaned raw phosphate is discharged from the plant via the cooler.

In one variant, the treatment of the material in the second reactor stage takes place in a suspension reactor; the material retention time of the first stage is between 3 and 6 seconds and in the second stage between 9 and 18 seconds; and the ratio of the material retention time to the gas retention time in each reactor is between 3:1 and 10:1.

In another variant, the expulsion of cadmium from the material in the second reactor stage takes place in a fluid-bed reactor; the material retention time in the first stages is between 3 and 6 seconds; the ratio of the material retention time to the gas retention time in the first stage is substantially 3:1; and the material retention time in the second stage is between 5 and 15 minutes.

A reducing agent for carrying out the expulsion of cadmium from the material in the second reactor stage may be provided by carbon in the raw phosphate material.

Figure 2:
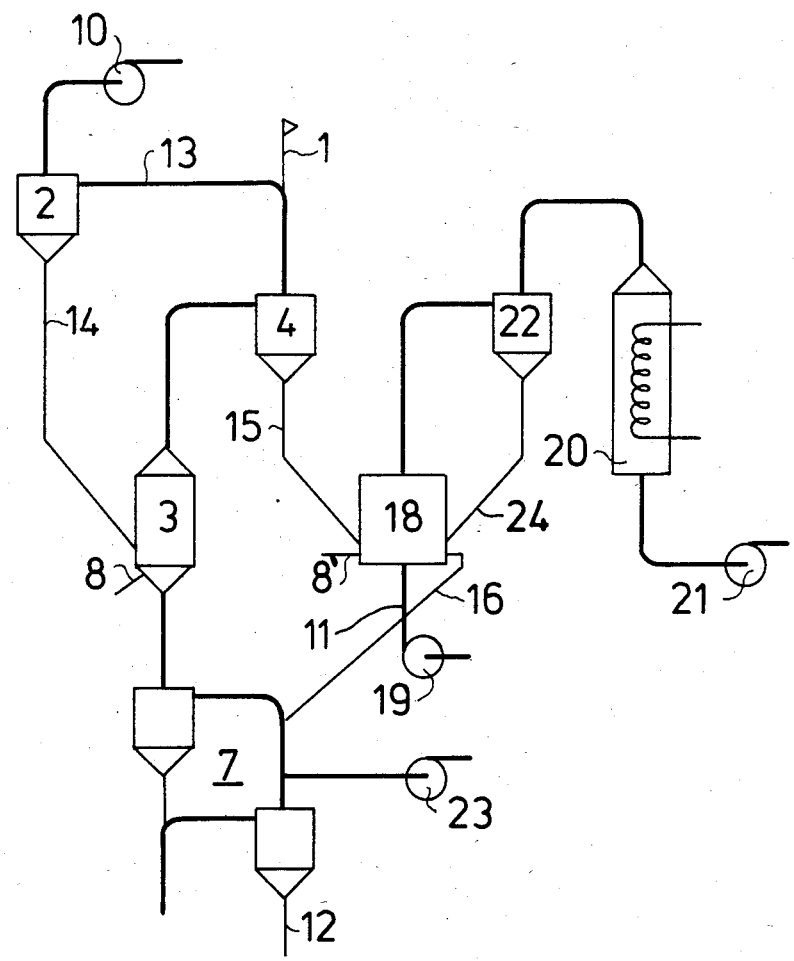

The invention will now be explained in more detail by way of example with reference to the accompanying drawings, in which:

FIG. 1 shows diagrammatically a known two-stage phosphate treatment plant with two suspension reactors working in series, and the exit gas outlet of which is connected with a cadmium condenser equally known per se; and, FIG. 2 shows a similar plant, but comprising a suspension reactor and a fluid-bed reactor.

In the plant shown in FIG. 1 the treatment of the raw phosphate takes place exclusively by means of suspension reactors 3 and 5. The raw material is fed at an inlet 1, preheated and dried suspended in the hot reactor exit gases in a pipe 13 and cyclone 2, separated from the exit gas in the cyclone and passed through a pipe 14 to the first reactor stage, a suspension reactor 3, which is a cylindrical tank to which combustion air is fed as spent cooler air from a cooler 7 through a pipe 9, and in which fuel is introduced at a bottom inlet 8. The preheated raw phosphate is suspended in the reactor in the combustion air which moves vertically upwards therethrough.

The phosphate is heated by the heat developed to a reaction temperature of about 1000° C. during a material retention time in the reactor 3 of 3–6 seconds corresponding to a gas retention time of 1–2 seconds, and just sufficiently to ensure simultaneous use of the entire amount of fuel introduced, but without any actual explusion of cadmium taking place. The gas/material suspension is passed from the reactor 3 to a separator 4, here shown as a cyclone, from where the separated material is passed via a pipe 15 to the second reactor stage, a suspension reactor 5, which acts in the same way as the reactor 3, combustion air and fuel being supplied through the pipe 9 and at an inlet 8', respectively. The cleaned exit gas from the reactor 3 is passed from the separator 4 to the preheater 2 via the pipe 13 to be utilized therein for preheating the raw material supplied via the inlet 1. From the cyclone separator 2 the exit gas is sucked out by means of a fan 10 and passed to an exit gas filter not shown. In the reactor 5 having a material retention time of 9–18 seconds and a gas retention time of 3–6 seconds and to which is supplied an amount of combustion air not exceeding 20%, preferably 5–15%, of the amount of air supplied to the reactor 3, and a corresponding amount of fuel so that the heat treatment of the material supplied in the reactor 5 takes place in an atmosphere of low oxygen content, the material is further heated to a temperature which not more than 100° C. higher than the temperature in the first stage 3, i.e. to about 1100° C. By this the cadmium content is substantially driven off from the phosphate, which, in a separator 6, is separated from the exit gas and subsequently passed through a pipe 16 to the cooler 7, from where the cleaned phosphate, cooled to approx 90° C., is discharged through an outlet 12. Excess air from the cooler can be discharged by a fan 23 and passed to a filter not shown and/or to the preheater to be used for preheating purposes.

The strongly cadmium-containing amount of exit gas from the reactor 5 constitutes, because of the heavily reduced supply of air to this reactor and the low heating requirement therein, only a comparatively small part of the total amount of exit gas from the plant and may thus be discarded without any significant energy loss. The exit gases from the reactor 5 are consequently passed from the separator 6 to a cadmium condenser 20, in which the cadmium in known manner is precipitated, whereafter the cleaned exit gas is passed by means of a fan 21 to a filter not shown.

In the plant shown in FIG. 2, in which the second reactor stage is constituted by a fluid-bed reactor 18 (reactor with fluidized bed of the grate type) or spouted-bed reactor (reactor with fluidized bed using a single-pipe supply of gas), the desired cadmium expulsion is obtained in 5–10 minutes at an operational temperature of 950°–1000° C., which is thus somewhat lower than the operational temperature of a corresponding suspension reacotr. As was the case with the plant shown in FIG. 1 the amount of combustion air supplied to the second reactor stage 18 is also, in the plant according to FIG. 2, not more than 20%, preferably 5–15%, of the amount of air supplied to the first reactor stage 3, this amount of air, besides carrying away cadmium, only serving to fluidize the material in the reactor bed, as in this reactor type there is no demand for increased heating of the material. The air is supplied by a compressor 19 through a pipe 11. Fuel is supplied at an inlet 8'. In the fluidized bed a suitable amount of fuel is burnt with the sole purpose of removing the oxygen supplied by the fluidizing air so that the desired neutral or slightly reducing atmosphere is obtained in the reactor. The exit gases from the combustion proper contain the expelled cadmium and consequently the cleaning of the exit gases takes place along the same lines as described in connection with FIG. 1, i.e. in a separator 22 and the cadmium condenser 20. While the majority of cleaned phosphate is discharged from the fluid-bed reactor in the usual manner through a simple overflow, and is passed through the pipe 16 to the cooler 7, the small amount of material separated from the exit gases in the separator 22 is returned to the reactor via a pipe 24.

Experiments with Taiba raw phosphate from Senegal, with a cadmium content of 97 ppm in untreated form and a carbon content corresponding to 0.22%, i.e. a carbon surplus of more than 200 times the amount necessary for reduction of cadmium oxide, have shown that by a thermal treatment in a first suspension reactor having 3 seconds material retention time there was obtained at 850° C. in neutral atmosphere a decrease to 94 ppm Cd and at 1000° C. a decrease to 79 ppm Cd. By the treatment in the second reactor the Cd-content according to the suspension reactor solution having a material retention time of 12 seconds and a temperature of 1100° C. was subsequently lowered to 24 ppm, while according to the fluid-bed reactor solution having a material retention time of 10 minutes and a temperature of about 900° C. the result was 22 ppm. It is thus possible by the method according to the invention to remove about 75% of the damaging heavy metal cadmium from raw phosphate and consequently reduce the corresponding cadmium spreading through the use of phosphate fertilizers.

Whether one or the other reactor type should be preferred for the second reactor stage in a plant for carrying out the method according to the invention should be based on purely technical evaluations. A plant with two suspension reactors achieves a very short total treatment period ( about a maximum of 25 seconds) of the material, a mechanically simple construction, a low pressure loss in the plant with resulting low power consumption and low operational costs, a plant working at a low subpressure and comparatively low material manufacturing costs. In return there may arise in such a plant problems in trying to obtain the desired operational stability because of treated material falling through as a consequence of high (kg material)/(kg gas) ratio, impaired reactivity of the product and risk of a very hot precipitation cyclone after the second reactor.

In a plant where the second reactor stage is a fluid-bed or sprouted-bed reactor there is obtained a considerably longer material retention time (5–15 minutes), and apparatus which from a mechanical viewpoint is more complicated and more expensive, and having a higher total power consumption, but in certain respects an operationally more reliable plant where the risk of material through-fall, impaired product reactively and very hot precipitation cyclones is significantly lower. Further, the amount of waste smoke after the second stage can be reduced. In return it is necessary to renounce achieving the theoretically highest possible degree of cleaning because of to and fro mixing in the fluidizing bed (the fact that cleaned and uncleaned material cannot be kept totally separated, but are mixed so that the product flow will contain a small amount of uncleaned material). The actual cadmium amount in the product will, however, only be about 1.2 times the minimum cadmium residue and the disadvantage can thus be said to be moderate.

I claim:

1. A method of cleaning cadmium-containing raw phosphate material of its cadmium content in a multistage reactor plant comprising a preheater, first and second reactors working in series, of which said first reactor is a suspension reactor and said second reactor is a fluid-bed reactor, and a cooler for cooling product treated in said reactors; characterized by providing said first reactor with separate oxygen-containing gas and fuel supplies, said first reactor having a material retention time; providing said second reactor with an oxygen-containing gas supply which is not more than 20% of said gas supply to said first reactor, said second reactor having a material retention time which is at least three times said material retention time of said first reactor; preheating said raw phosphate material; introducing said preheated material into said first reactor to be suspended in a mixture of said gas and fuel and heated to a reaction temperature of between 750° and 1050° C. in a flash-process during which the total amount of said fuel supply is used; passing said heated material suspension to a separator for precipitation of said heated material therefrom; passing said precipitated material to said second reactor to be subjected to further heat treatment in a non-oxidising atmosphere at a temperature which is not more than 100° C. higher than said reaction temperature in said first reactor, whereby said cadmium content is substantially driven off from said material and carried away from said second reactor together with exit gas therefrom while cleaned raw phosphate is discharged via said cooler.

2. A method according to claim 1, wherein said gas supply to said second reactor is between 5 and 15% of that to said first reactor.

3. A method according to claim 1, wherein said second reactor is a suspension reactor; said material retention time of said first and second reactors is between 3 and 6 seconds and between 9 and 18 seconds, respectively; and the ratio of said material retention time to a gas retention time in each of said reactors is between 3:1 and 10:1.

4. A method according to claim 1, wherein a reducing agent for carrying out said expulsion of cadmium from said material in said second reactor is provided by carbon contained in said raw phosphate material.

5. A method according to claim 1, wherein said second reactor is a fluid-bed reactor; said material retention time in said first reactor is between 3 and 6 seconds; a ratio of said material retention time to a gas retention time in said first reactor is substantially 3:1; and said material retention time in said second reactor is between 5 and 15 minutes.

6. A method of cleaning cadmium-containing raw phosphate material of its cadmium content in a multistage reactor plant comprising a preheater, first and second reactors working in series, of which said first reactor is a suspension reactor and said second reactor is a suspension reactor, and a cooler for cooling product treated in said reactors; characterized by providing said first reactor with separate oxygen-containing gas and fuel supplies, said first reactor having a material retention time; providing said second reactor with an oxygen-containing gas supply which is not more than 20% of said gas supply to said first reactor, said second reactor having a material retention time which is at least three times said material retention time of said first reactor; preheating said raw phosphate material; introducing said preheated material into said first reactor to be suspended in a mixture of said gas and fuel and heated to a reaction temperature of between 750° C. and 1050° C. in a flash-process during which the total amount of said fuel supply is used; passing said heated material suspension to a separator for precipitation of said heated material therefrom; passing said precipitated material to said second reactor to be subjected to further heat treatment in a non-oxidising atmosphere at a temperature which is not more than 100° C. higher than said reaction temperature in said first reactor, whereby said cadmium content is substantially driven off from said material and carried away from said second reactor together with exit gas therefrom while cleaned raw phosphate is discharged via said cooler.

7. A method according to claim 6, wherein said gas supply to said second reactor is between 5 and 15% of that to said first reactor.

8. A method according to claim 6, wherein a reducing agent for carrying out said expulsion of cadmium from said material in said second reactor is provided by carbon contained in said raw phosphate material.

* * * * *

UNITED STATES PATENT AND TRADEMARK OFFICE
CERTIFICATE OF CORRECTION

PATENT NO. : 4,592,900
DATED : June 3, 1986
INVENTOR(S) : Soren Hundebol

It is certified that error appears in the above-identified patent and that said Letters Patent are hereby corrected as shown below:

Column 6, line 15, "claim 1" should be --claim 6--.

Signed and Sealed this

Second Day of December, 1986

Attest:

DONALD J. QUIGG

Attesting Officer

Commissioner of Patents and Trademarks